(12) United States Patent
Mizuochi

(10) Patent No.: US 11,175,502 B2
(45) Date of Patent: Nov. 16, 2021

(54) HEAD-UP DISPLAY

(71) Applicant: NIPPON SEIKI CO., LTD., Niigata (JP)

(72) Inventor: Masahiko Mizuochi, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 0 days.

(21) Appl. No.: 17/253,025

(22) PCT Filed: Jul. 2, 2019

(86) PCT No.: PCT/JP2019/026233
§ 371 (c)(1),
(2) Date: Dec. 16, 2020

(87) PCT Pub. No.: WO2020/009092
PCT Pub. Date: Jan. 9, 2020

(65) Prior Publication Data
US 2021/0215934 A1   Jul. 15, 2021

(30) Foreign Application Priority Data

Jul. 4, 2018   (JP) .............................. JP2018-127586

(51) Int. Cl.
*G02B 27/01* (2006.01)
*B60K 35/00* (2006.01)

(52) U.S. Cl.
CPC .......... *G02B 27/0149* (2013.01); *B60K 35/00* (2013.01); *B60K 2370/1529* (2019.05); *G02B 2027/0169* (2013.01)

(58) Field of Classification Search
None
See application file for complete search history.

(56) References Cited

U.S. PATENT DOCUMENTS 6,161,607 A * 12/2000 de Kimpe ................ E06B 9/40
160/121.1
8,123,609 B2 * 2/2012 Sekiguchi ........... G07F 17/3213
463/20
(Continued)

FOREIGN PATENT DOCUMENTS

JP      60-009078 U      1/1985
JP      2008-305168 A    12/2008
(Continued)

OTHER PUBLICATIONS

International Search Report issued in the corresponding International Patent Application No. PCT/JP2019/026233, dated Sep. 10, 2019, with English translation.

*Primary Examiner* — Toan H Vu
(74) *Attorney, Agent, or Firm* — McDermott Will & Emery LLP

(57) ABSTRACT

Provided is a head-up display with enhanced manufacturability when attaching a translucent sheet. This head-up display is provided with: a display device for outputting display light; a translucent sheet that is translucent and comprises a sheet having a sheet peripheral edge; a case that accommodates the display device and has an opening that is covered by the translucent sheet and through which the display light is emitted outside through the translucent sheet, and a sheet holding part that is at an opening peripheral edge and holds the sheet peripheral edge; and a fixing frame that covers the sheet peripheral edge and fixes the translucent sheet to the sheet holding part.

6 Claims, 7 Drawing Sheets

(56) References Cited

U.S. PATENT DOCUMENTS

| | | | | |
|---|---|---|---|---|
| 8,411,315 B2* | 4/2013 | Hitose | ............... | H04N 1/00347 |
| | | | | 358/1.18 |
| 10,349,077 B2* | 7/2019 | Hattori | ................... | H04N 19/52 |
| 2006/0291241 A1* | 12/2006 | Wojtowicz | ............. | G09F 13/04 |
| | | | | 362/604 |
| 2008/0303737 A1 | 12/2008 | Honda et al. | | |
| 2014/0183342 A1* | 7/2014 | Shedletsky | ......... | H01L 51/5218 |
| | | | | 250/215 |
| 2016/0186942 A1* | 6/2016 | De Gier | ................. | F21S 8/026 |
| | | | | 362/234 |
| 2019/0129191 A1* | 5/2019 | Zhang | .................... | G02B 30/27 |
| 2019/0234585 A1* | 8/2019 | Le Corre | .............. | F21S 10/002 |

FOREIGN PATENT DOCUMENTS

| | | |
|---|---|---|
| JP | 2010-105555 A | 5/2010 |
| JP | 2010-132207 A | 6/2010 |

* cited by examiner

HEAD-UP DISPLAY

CROSS REFERENCE TO RELATED APPLICATIONS

This application is the U.S. National Phase under 35 U.S.C. § 371 of International Application No. PCT/JP2019/026233, filed on Jul. 2, 2019, which claims the benefit of Japanese Application No. 2018-127586, filed on Jul. 4, 2018, the entire contents of each are hereby incorporated by reference.

TECHNICAL FIELD

The present invention relates to a head-up display mounted on a vehicle or the like.

BACKGROUND ART

A head-up display reflects display light showing an image generated in a display device, on a reflective member such as a concave mirror, and then emits it from an opening of a case to the outside of the device. The emitted display light shines on a transparent reflective member such as a windshield, and makes a viewer visually recognize a virtual image.

The opening of the case has a curved shape and is covered with a translucent sheet having translucency. For example, in Patent Document 1, a translucent sheet is fixed to the opening peripheral edge of the case via a double-sided tape. In a fixing operation, the double-sided tape is at first affixed to the opening peripheral edge. The double-sided tape is divided into plural pieces, thereby facilitating the affixing operation. Subsequently, a translucent sheet is aligned to an appropriate position on the double-sided tape, and then arranged, pressurized and thereby fixed to the opening peripheral edge.

PRIOR ART DOCUMENT

Patent Document

Patent Document 1: Japanese Patent Application Publication No. 2010-105555

SUMMARY OF THE INVENTION

Problems to be Solved by the Invention

In the head-up display in Patent Document 1, the double-sided tape is divided and thus forms seams. This has been likely to cause less water resistance and dust resistance in these seams. Moreover, proficient skills have been required for the operation of affixing the double-sided tape, and the operation of arranging and pressurizing the translucent sheet in a curved shape, leading to low manufacturability.

The present invention is made in view of such circumstances, and has an object to provide a head-up display that can improve manufacturability in attachment of a translucent sheet.

Solution to Problem

The head-up display according to the present invention includes, for solving the problem mentioned above, a display device configured to output display light; a translucent sheet having translucency and including a sheet with a sheet peripheral edge; a case having an opening and a sheet holding part, the opening being covered with the translucent sheet and emitting the display light outward via the translucent sheet, the sheet holding part being located on the peripheral edge of the opening and holding the sheet peripheral edge, the case containing the display device; and a fixing frame covering the sheet peripheral edge and fixing the translucent sheet to the sheet holding part.

Effect of the Invention

The head-up display according to the present invention can improve manufacturability in attachment of a translucent sheet.

MODE FOR CARRYING OUT THE INVENTION

An embodiment of the head-up display according to the present invention will be described with reference to the appended drawings. In the embodiment, description will be provided by use of an example where the head-up display according to the present invention is mounted on an automobile, but application can also be made for head-up displays mounted on motorcycles, vessels, agricultural machines, construction machines, and the like.

Figure 1:
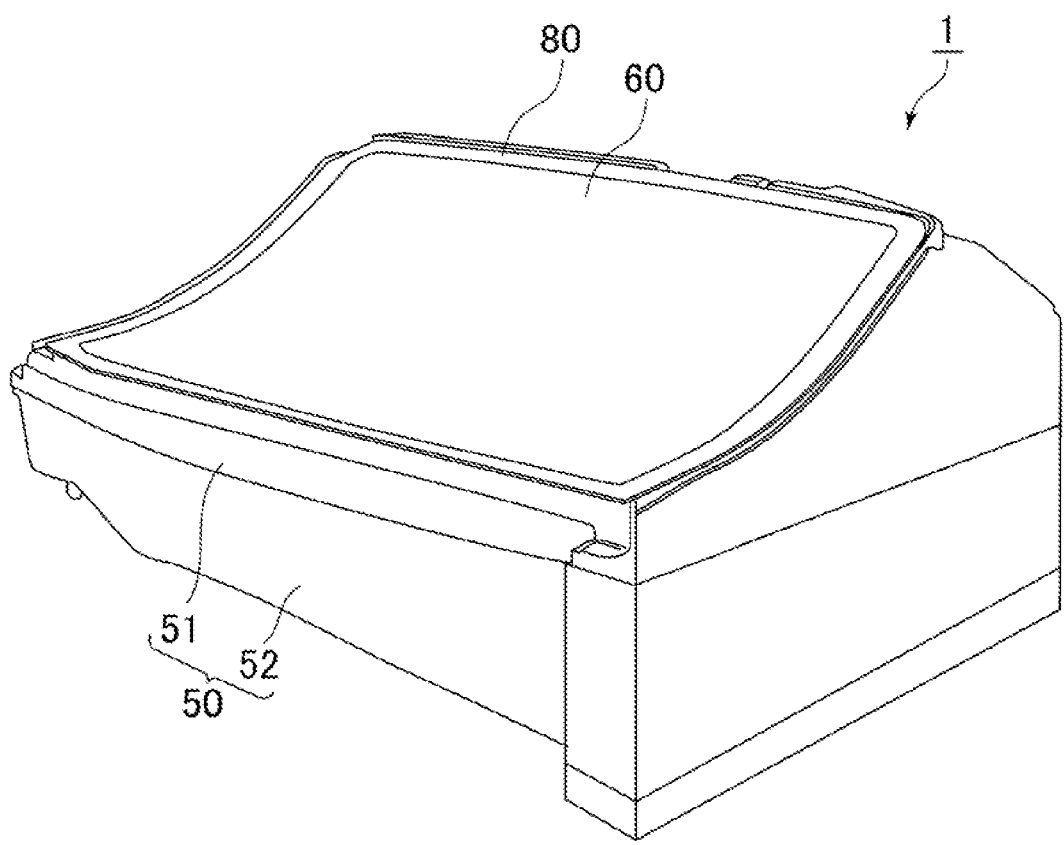
FIG. 1 is a perspective view illustrating an embodiment of the head-up display according to the present invention and the configuration of an appearance thereof.

FIG. 1 is a perspective view illustrating an embodiment of the head-up display according to the present invention and is the configuration of an appearance thereof.

Figure 2:
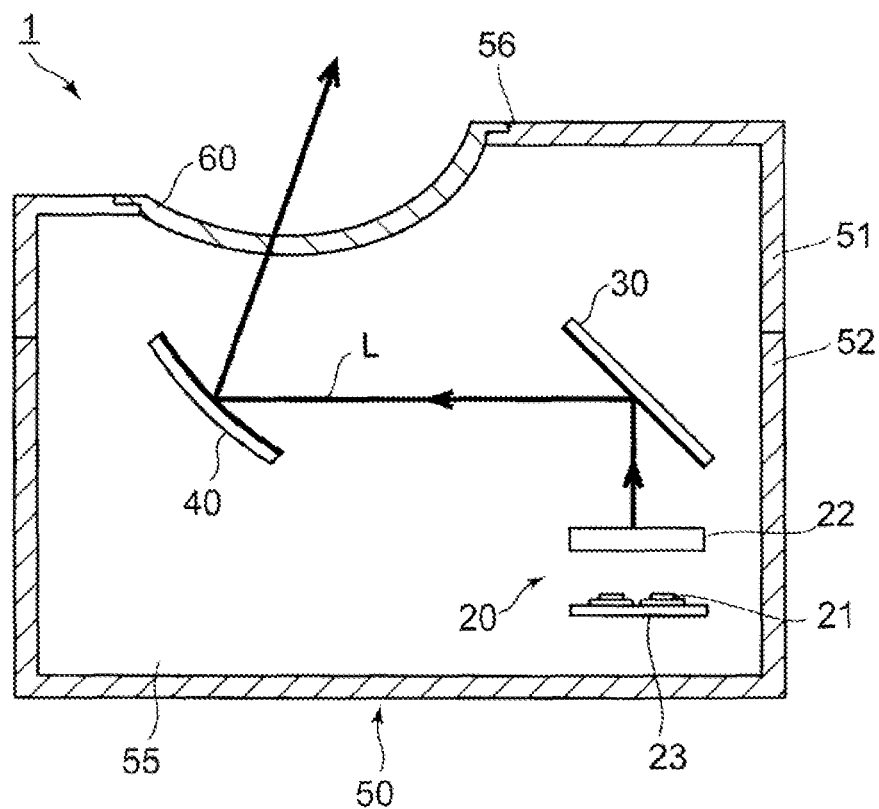
FIG. 2 is a schematic sectional view showing an inner configuration of the head-up display.

FIG. 2 is a schematic sectional view showing an inner configuration of the head-up display 1.

The head-up display 1 (HUD 1) reflects display light L to be projected, on a vehicle windshield that is a transparent reflective member, in the direction to a viewer (driver) of the vehicle, and makes the viewer visually recognize a virtual image (display image). This enables the viewer to observe the virtual image, which is superimposed on a landscape.

The HUD 1 is arranged inside an instrument panel of the vehicle. As shown in FIG. 2, the HUD 1 primarily has a display device 20, a plane mirror 30, a concave mirror 40, and a case 50.

The display device 20 primarily has a light source 21 and a liquid crystal display element 22. The display device 20 outputs the display light L.

The light source 21 is a light emitting diode packaged on a wiring board 23. The liquid crystal display element 22 is a TFT-type liquid crystal display element. The liquid crystal display element 22 is arranged in front of the light source 21

(an upper part in the figure) so as to transmit illuminated light from the light source 21 to form the display light L. In other words, the liquid crystal display element 22 displays display information such as a numerical value or a sign (e.g., velocity or engine speed of the vehicle) by the light emitted from the light source 21 on the basis of control of an element driver circuit. The display device 20 is fixed and held inside the case 50 in such manner that the emitting side of the display light L faces a plane mirror 30, and that the optical axis of the display light L intersects the plane mirror 30.

The plane mirror 30 (reflecting mirror) has a base material made of synthetic resin material, and a reflective film formed by vapor deposition or the like on the surface of the base material. The plane mirror 30 reflects the display light L output from the display device 20, toward the concave mirror 40.

The concave mirror 40 has a base material made of synthetic resin material, and a reflective film formed by vapor deposition or the like on the surface of the base material. The concave mirror 40 further reflects the display light L reflected from the plane mirror 30, toward the windshield. The concave mirror 40 has function as a magnifying glass, and magnifies a display image and reflects it to the windshield. This makes the viewer visually recognize a display representation generated by magnifying the display image displayed on the display device 20. The concave mirror 40 rotates about the rotation axis with an actuator. The actuator regulates the angle of the concave mirror 40 by rotating the concave mirror 40, thereby adjusting the irradiation position of the display light L, or tuning the angle to prevent outside light from reflecting to be directed to the display device 20 by the concave mirror 40.

The case 50 is made of lightproof synthetic resin (e.g., black polypropylene), and has an upper case 51 and a lower case 52. The case 50 forms a box body through combining the upper case 51 and the lower case 52, and has an inner space 55 primarily containing the display device 20, the plane mirror 30, and the concave mirror 40 (FIG. 2).

The upper case 51 has an opening 56, which is disposed in a part facing the windshield. The opening 56 is covered with a translucent sheet 60, which has translucency. A configuration of attachment of the translucent sheet 60 to the upper case 51 will be described later.

The lower case 52 primarily has a configuration for attaching the display device 20, the plane mirror 30, and the concave mirror 40.

Figure 4:
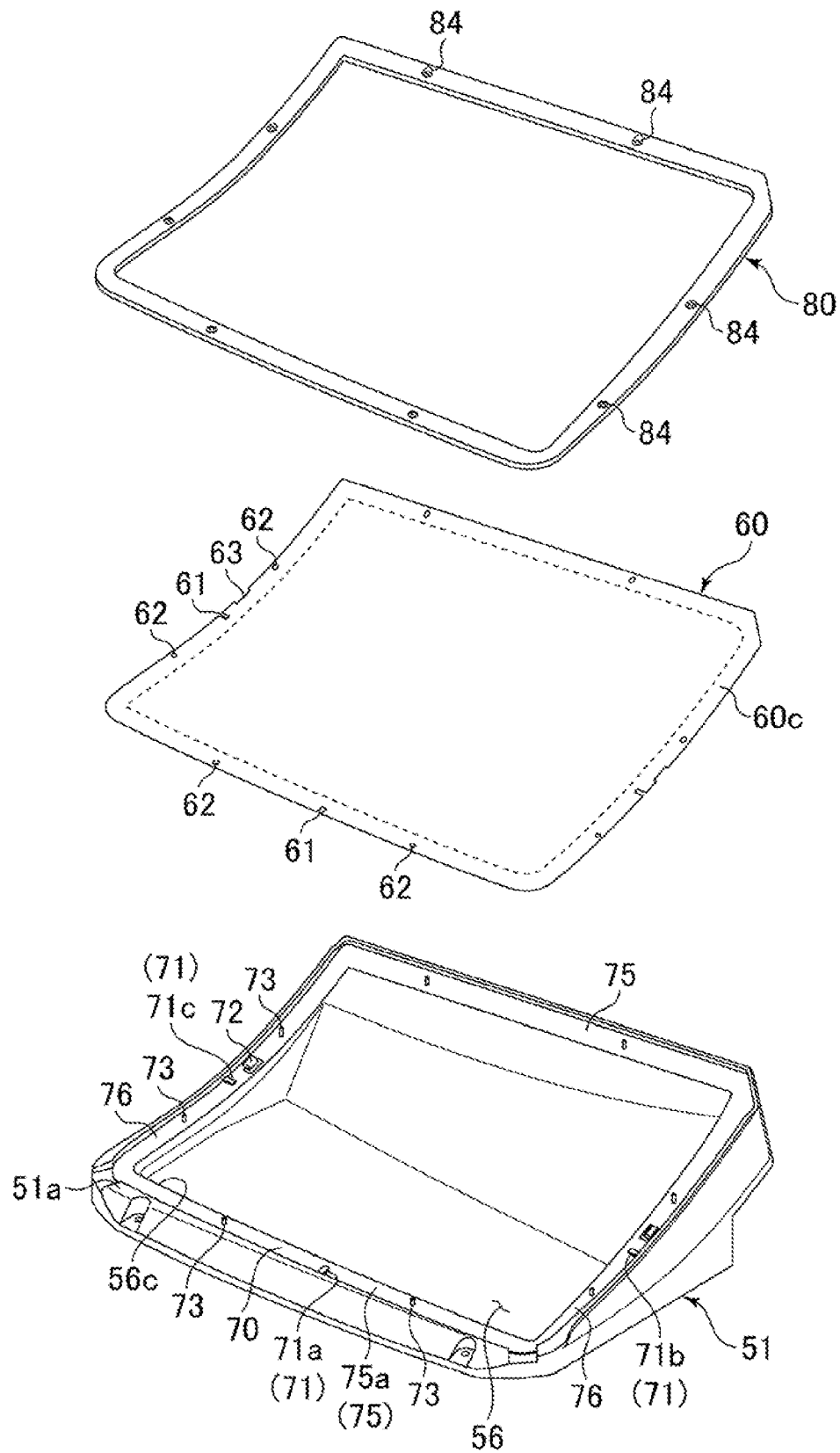
FIG. 4 is an exploded perspective view showing the upper case, the translucent sheet, and the fixing frame in FIG. 3.

The translucent sheet 60 is a planar sheet made of synthetic resin material (e.g., acrylic resin). The translucent sheet 60 has a sheet peripheral edge 60c (FIG. 4). The translucent sheet 60 is formed into a curved shape (curved surface shape), and attached to the upper case 51 via the sheet peripheral edge 60c. The translucent sheet 60 has translucency to transmit (passe) the display light L reflected on the concave mirror 40. In other words, the opening 56 covered with the translucent sheet 60 emits the display light L reflected on the concave mirror 40, outward via the translucent sheet 60. The display light L thus emitted is projected on the windshield, thereby displaying a virtual image for a viewer.

Incidentally, the curved shape of the translucent sheet 60 is designed so as to prevent outside light reflected on the translucent sheet 60 from directing to the irradiated area of the display light L on the windshield.

Next, the configuration of attachment of the translucent sheet 60 to the upper case 51 will be described in detail.

Figure 3:
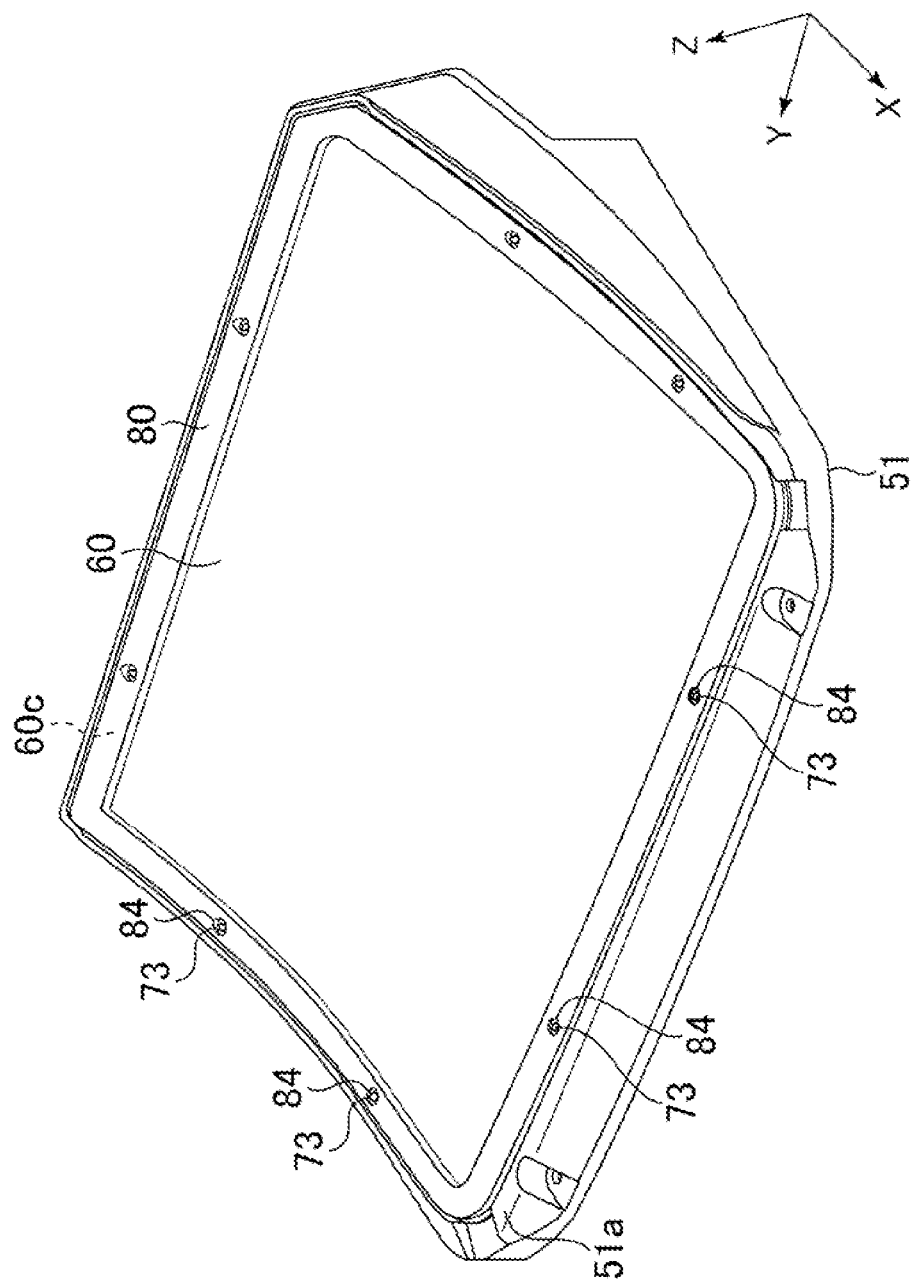
FIG. 3 is a perspective view particularly showing an upper case, a translucent sheet, and a fixing frame.

FIG. 3 is a perspective view particularly showing the upper case 51, the translucent sheet 60, and a fixing frame 80.

FIG. 4 is an exploded perspective view showing the upper case 51, the translucent sheet 60, and the fixing frame 80 in FIG. 3.

Figure 5:
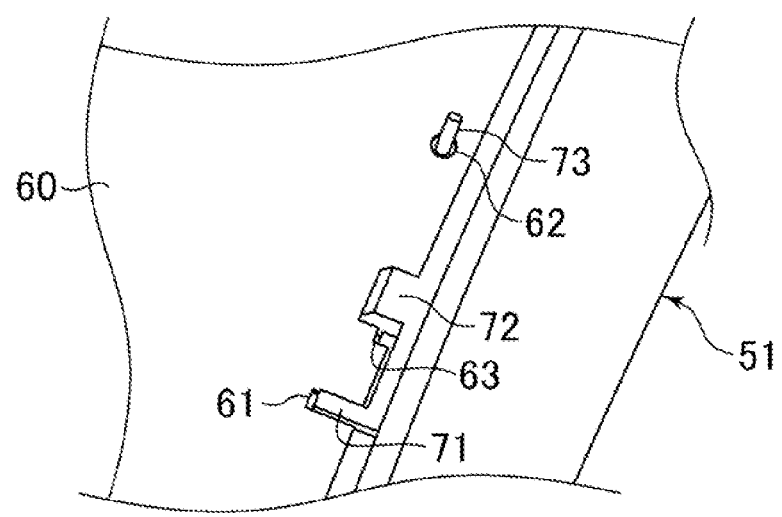
FIG. 5 is an enlarged view for particularly illustrating a positioning rib, a temporary fixing hook, and a fixing pin in the upper case, and a slit, a sheet hole, and a temporary fixing notch in the translucent sheet.

FIG. 5 is an enlarged view for particularly illustrating a positioning rib 71, a temporary fixing hook 72, and a fixing pin 73 in the upper case 51, and a slit 61, a sheet hole 62, and a temporary fixing notch 63 in the translucent sheet 60.

Figure 6:
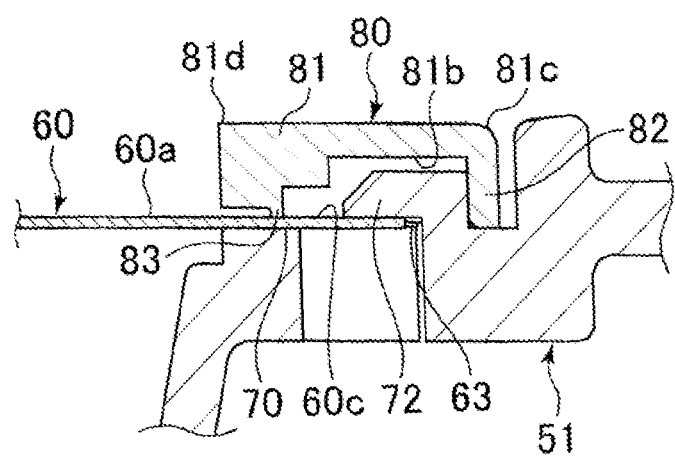
FIG. 6 is a sectional view for particularly illustrating the temporary fixing hook.

FIG. 6 is a sectional view for particularly illustrating surroundings of the temporary fixing hook 72.

Figure 7:
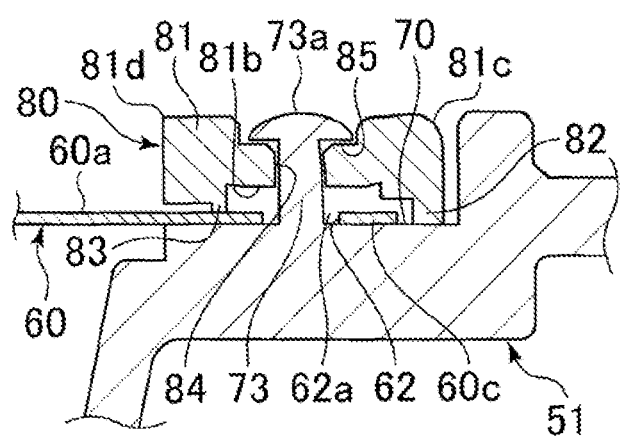
FIG. 7 is a sectional view for particularly illustrating surroundings of the fixing pin.

FIG. 7 is a sectional view for particularly illustrating surroundings of the fixing pin 73.

The opening 56 part of the upper case 51 is covered with the translucent sheet 60 on the outer surface of the upper case 51. Moreover, the sheet peripheral edge 60c of the translucent sheet 60 is covered with the fixing frame 80. Here, the sheet peripheral edge 60c includes at least an area overlapping with a sheet holding part 70, and an area covered with the fixing frame 80.

The upper case 51 has the sheet holding part 70 as an area positioned on the peripheral edge of the opening 56 to hold the sheet peripheral edge 60c of the translucent sheet 60. The sheet holding part 70 has four sides as a plurality of sides that defines the opening 56. In other words, the sheet holding part 70 has two sides 75 that face each other and extend along the Y-direction in FIG. 3, which is a first direction, and two sides 76 that face each other and extend along the X-direction as a second direction perpendicular to the Y-direction. These sides 75 and 76 have a certain width from the opening peripheral edge 56c. The sheet holding part 70 forms a concave part relative to a front side 51a facing upward above the upper case 51 (in the Z-direction), and this concave part is formed corresponding to the shape of the translucent sheet 60. The sheet holding part 70 has the positioning rib 71, the temporary fixing hook 72, and the fixing pin 73.

The positioning ribs 71 define a position of the translucent sheet 60 on the sheet holding part 70 in the Y-direction and the X-direction. The positioning ribs 71 are disposed in three sites. In particular, the positioning rib 71a is disposed at a substantially central position of the side 75a positioned lower relative to the Z-direction (frontward in FIG. 3) among the sides 75. The positioning rib 71b or 71c is disposed at the substantially central position of each of the sides 76.

In fixing of the translucent sheet 60 to the upper case 51, the temporary fixing hook 72 temporarily fixes the translucent sheet 60, which has a flat shape, to fit to the sheet holding part 70, which has a curved shape, until the translucent sheet 60 is fixed by the fixing frame 80. The temporary fixing hooks 72 are disposed at two sites. In particular, the temporary fixing hook 72 is disposed at a site with the maximum curvature in each of the sides 76.

After the translucent sheet 60 and the fixing frame 80 are arranged on the sheet holding part 70 with the fixing pin 73 passing through the holes 62 and 84 corresponding to the translucent sheet 60 and the fixing frame 80, the fixing pin 73 is rigidly joined to the fixing frame 80 by welding. The fixing pins 73 are provided in pairs in each of the sides 75 and 76, at eight sites in total, and preferably disposed equally in the sheet holding part 70.

The translucent sheet 60 has the slit 61, the sheet hole 62, and the temporary fixing notch 63 as the configuration corresponding to the positioning rib 71, the temporary fixing hook 72, and the fixing pin 73.

The slit 61 is disposed at a position corresponding to that of each of the positioning ribs 71, and receives insertion of the positioning rib 71.

The sheet hole 62 is disposed at a position corresponding to each of the fixing pins 73, and allows each of the fixing pin 73 to pass through. The sheet hole 62 is formed so as to have a certain clearance 62a relative to the fixing pin 73 as shown in FIG. 7. This leads to interference between the fixing pin 73 and the translucent sheet 60 (the peripheral edge of the sheet hole 62) through vibration and thermal expansion, thereby providing reduction in distortion of the translucent sheet 60 caused by the fixing pin 73.

The temporary fixing notch 63 is disposed at a position corresponding to the temporary fixing hook 72. The temporary fixing notch 63 is disposed in order to improve workability in insertion of the translucent sheet 60 into the temporary fixing hook 72.

The fixing frame 80 is made of lightproof synthetic resin material that is resin having melting point higher than that of the fixing pin 73 of the upper case 51 (e.g., polybutylene terephthalate (PBT)). The fixing frame 80 covers the sheet peripheral edge 60c and fixes the translucent sheet 60 to the sheet holding part 70. The fixing frame 80 also has function to shield the sheet holding part 70 from the viewer. The fixing frame 80 has a body 81, an outer peripheral leg 82, and an inner peripheral leg 83.

The body 81 has a frame shape corresponding to the sheet holding part 70 having a curved shape. The body 81 has the fixing frame hole 84, which is disposed at a position corresponding to each of the fixing pins 73 and allows the fixing pin 73 to pass through. The body 81 has, as shown in FIG. 7, a concave part 85 around the fixing frame hole 84. The concave part 85 is a site to join to a tip 73a of the fixing pin 73 melted for welding.

The outer peripheral leg 82 protrudes and extends from an outer periphery 81c of the body 81 (the side of the outer periphery 81c) substantially perpendicularly to a back side 81b of the body 81 (extends in the substantially Z-direction). The outer peripheral leg 82 is a strip of convex part relative to the back side 81b. The outer peripheral leg 82 continuously linearly contacts the front side of the sheet holding part 70, and provides greater dust resistance and water resistance for the proximity of the inner periphery 81d relative to the outer peripheral leg 82. This allows the outer peripheral leg 82 to reduce entry of dust or water inside the HUD 1 from the opening 56.

The inner peripheral leg 83 protrudes and extends from the side of an inner periphery 81d of the body 81 substantially perpendicularly to the back side 81b of the body 81 (extends in the substantially Z-direction). The inner peripheral leg 83 is a strip of convex part relative to the back side 81b. The inner peripheral leg 83 continuously linearly contacts the sheet peripheral edge 60c (the sheet peripheral edge 60c in the front side 60a of the translucent sheet 60), and provides greater dust resistance and water resistance for the proximity of the outer periphery 81c relative to the inner peripheral leg 83. This allows the inner peripheral leg 83 to reduce entry of dust or water inside the HUD 1 from the opening 56, as in the outer peripheral leg 82. Moreover, the inner peripheral leg 83 is disposed closer to the outer periphery 81c than the inner periphery 81d of the body 81. Accordingly, even if the HUD 1 vibrates in response to vibration of a vehicle and leads to friction between the inner peripheral leg 83 and the translucent sheet 60 that produces shavings of resin, the effect of the shavings can be reduced within the inside of the sheet peripheral edge 60c, which is a visible area in the translucent sheet 60.

Next, a procedure in attaching the translucent sheet 60 to the upper case 51 will be described.

First, the translucent sheet 60 is inserted into the temporary fixing hook 72 of the sheet holding part 70 at a position of the temporary fixing notch 63 disposed. This makes the translucent sheet 60 maintain a curved shape and temporarily fixed to the sheet holding part 70. Subsequently or almost simultaneously, the translucent sheet 60 is placed on the sheet holding part 70 of the upper case 51, along with the slit 61 being adjusted to the position of the positioning rib 71. Simultaneously, the fixing pin 73 is inserted into the sheet hole 62 of the translucent sheet 60, and passes through the translucent sheet 60.

Then, the fixing frame 80 is placed on the sheet holding part 70. At that time, the fixing pin 73 is inserted into and passes through the fixing frame hole 84 of the fixing frame 80. This makes the translucent sheet 60 interposed between the upper case 51 and the fixing frame 80.

Subsequently, the tip 73a part of the fixing pin 73 that protrudes from the fixing frame hole 84 is welded to the concave part 85 of the fixing frame 80, thereby joining the fixing pin 73 and the fixing frame 80. In this instance, since the fixing frame 80 is made of a material with melting point higher than that of the material of the fixing pin 73, the fixing frame 80 will not melt together with the fixing pin 73 in welding. The fixing frame 80 is fixed against the fixing pin 73, thereby interposing and fixing the translucent sheet 60 along with the sheet holding part 70. This makes the translucent sheet 60 securely held on the upper case 51, for example, so as not to fall from the upper case 51 upon receiving a load in the direction to the inside of the HUD 1 (in the Z-direction).

Such HUD 1 can improve manufacturability in attachment of the translucent sheet 60. In other words, in fixing of the translucent sheet 60 to the upper case 51 by use of a double-sided tape, operations will be required for affixing the double-sided tape to the sheet holding part 70 having a curved shape, and then arranging and pressurizing the translucent sheet 60 on the double-sided tape. By contrast, the HUD 1 in the embodiment only requires operations of placing serially the translucent sheet 60 and the fixing frame 80 on the sheet holding part 70, and welding the fixing pin 73. This allows an attachment operation in attachment of the translucent sheet 60 to be easily performed without need of proficient skills.

In addition, the seams of the double-sided tape have had less water resistance and dust resistance. By contrast, the HUD 1 in the embodiment covers the sheet holding part 70 continuously and seamlessly with the outer peripheral leg 82 and the inner peripheral leg 83 of the fixing frame 80, and thus will not reduce water resistance and dust resistance.

Furthermore, in use of the HUD 1, the translucent sheet 60 is likely to unintentionally stretch or contract due to heat. By contrast, the positioning ribs 71 is disposed at a substantially central position in each of the sides 75 and 76, thereby providing uniform amounts of expansion or contraction for each of the sides 75 and 76 in each area divided by the positioning ribs 71 (in the X- and Y-, plus and minus directions). This provides the HUD 1 with reduced distortion of the translucent sheet 60 and reduced distortion of the display light L transmitting through the translucent sheet 60.

Although several embodiments of the present invention have been described, these embodiments have been presented as examples, and are not intended to limit the scope of the invention. These novel embodiments can be performed in other various forms, and can include a variety of omissions, replacements, and alterations within a range without departing from the spirit of the invention. These embodiments and variations thereof fall within the scope or spirit of the invention, as well as fall within the scope of the claimed invention and equivalents thereof For example, the positions and numbers of the positioning rib 71 and the slit 61, the temporary fixing hook 72 and the temporary fixing notch 63, and the fixing pin 73, the sheet hole 62, and the fixing frame hole 84; or the shape of the opening 56 of the upper case 51 are an example, and not limited thereto.

Furthermore, the fixing frame 80 may be fixed to the fixing pin 73 by a method other than welding. For example, the fixing frame 80 may be fixed by press-fit of a packing piece such as an 0-ring, to the tip 73a of the fixing pin 73 protruding from the fixing frame hole 84, so as to impose the fixing frame 80 between the packing piece and the upper case 51 (sheet holding part 70).

DESCRIPTION OF REFERENCE NUMERALS

1 Head-up display (HUD)
20 Display device
21 Light source
22 Liquid crystal display element
23 Wiring board
30 Plane mirror
40 Concave mirror
50 Case
51 Upper case
51a Front side
52 Lower case
55 Inner space
56 Opening
56c Opening peripheral edge
60 Translucent sheet
60a Front side
60c Sheet peripheral edge
61 Slit
62 Sheet hole
62a Clearance
63 Temporary fixing notch
70 Sheet holding part
71, 71a, 71b, 71c Positioning ribs
72 Temporary fixing hook
73 Fixing pin
73a Tip
75, 75a, 76 Sides
80 Fixing frame
81 Body
81b Back side
81c Outer periphery
81d Inner periphery
82 Outer peripheral leg
83 Inner peripheral leg
84 Fixing frame hole
85 Concave part
L Display light

The invention claimed is:

1. A head-up display comprising:
a display device configured to output display light;
a translucent sheet having translucency and comprising a sheet with a sheet peripheral edge;
a case having an opening and a sheet holding part, the opening being covered with the translucent sheet and emitting the display light outward via the translucent sheet, the sheet holding part being positioned on the peripheral edge of the opening and holding the sheet peripheral edge, the case containing the display device; and
a fixing frame covering the sheet peripheral edge and fixing the translucent sheet to the sheet holding part.

2. The head-up display according to claim 1,
wherein the sheet holding part has a fixing pin,
wherein the translucent sheet has a hole allowing the fixing pin to pass through, and
wherein the fixing frame is fixed against the fixing pin, thereby fixing the translucent sheet to the sheet holding part.

3. The head-up display according to claim 1,
wherein the sheet holding part has a plurality of sides and a positioning rib, the plurality of sides extending along a first direction and a second direction perpendicular to the first direction, the positioning rib being disposed at a substantially central position of each of the sides and defining a position of the translucent sheet on the sheet holding part in the first direction and the second direction, and
wherein the translucent sheet has a slit receiving insertion of the positioning rib.

4. The head-up display according to claim 1,
wherein the fixing frame has a frame-shaped body, an outer peripheral leg protruding from the outer peripheral side of the body, and an inner peripheral leg protruding from the inner peripheral side of the body,
wherein the outer peripheral leg linearly contacts the sheet holding part, and
wherein the inner peripheral leg linearly contacts the sheet peripheral edge.

5. The head-up display according to claim 4, wherein the inner peripheral leg is disposed closer to the outer periphery than the inner periphery of the body.

6. The head-up display according to claim 2,
wherein the sheet holding part has a plurality of sides and a positioning rib, the plurality of sides extending along a first direction and a second direction perpendicular to the first direction, the positioning rib being disposed at a substantially central position of each of the sides and defining a position of the translucent sheet on the sheet holding part in the first direction and the second direction, and
wherein the translucent sheet has a slit receiving insertion of the positioning rib.

* * * * *